United States Patent [19]
Hunter et al.

[11] 3,856,976

[45] Dec. 24, 1974

[54] CYCLOPROPANE DERIVATIVE FUNGICIDES

[75] Inventors: Susan F. Hunter, Wye, near Ashford; Clive B. C. Boyce, Herne Bay; Brian P. Armitage, Sittingbourne; Pieter Ten Haken, Herne Bay, all of England; Willem M. Wagner, Amsterdam, Netherlands

[73] Assignee: Shell Oil Company, New York, N.Y.

[22] Filed: June 18, 1973

[21] Appl. No.: 371,214

Related U.S. Application Data

[62] Division of Ser. No. 246,226, April 21, 1972, abandoned.

[30] Foreign Application Priority Data
Apr. 23, 1971 Great Britain............... 011029/71

[52] U.S. Cl................ 424/317, 424/180, 424/220, 424/263, 424/267, 424/270, 424/274, 424/275, 424/304, 424/305, 424/315

[51] Int. Cl............................................. A01n 9/24
[58] Field of Search................. 424/317; 260/514 N

[56] References Cited
UNITED STATES PATENTS

| | | | |
|---|---|---|---|
| 3,320,121 | 5/1967 | Douros............................. | 424/317 |
| 3,567,740 | 3/1971 | Matsui et al..................... | 424/306 X |
| 3,678,172 | 7/1972 | Hill................................... | 424/306 |

FOREIGN PATENTS OR APPLICATIONS
978,352   12/1964   Great Britain................. 260/514 H

*Primary Examiner*—Albert T. Meyers
*Assistant Examiner*—Leonard Schenkhan

[57] ABSTRACT

Fungi are controlled by certain derivatives of 1,1-dihalocyclopropanes.

3 Claims, No Drawings

CYCLOPROPANE DERIVATIVE FUNGICIDES

This is a division of application Ser. No. 246,226 filed Apr. 21, 1972, now abandoned.

FIELD OF THE INVENTION

This invention relates to the use as fungicides of certain derivatives of 1,1-dihalocyclopropanes, some of which are novel, and to fungicidal formulations of such derivatives.

DESCRIPTION OF THE PRIOR ART

A search has disclosed the following patents which describe various derivatives of 1,1-dihalocyclopropanes, exhibiting various kinds of utility: U.S. Pat. Nos. 3,012,079; 3,047,611; 3,047,633; 3,074,984; 3,301,896; 3,320,121 and 3,558,726, and Netherlands Pat. No. 7010079.

PREFERRED EMBODIMENTS OF THE INVENTION

The present invention provides a class of fungicides and fungicidal formulations containing them, said fungicides having the general formula:

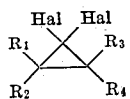

(I)

wherein Hal is halogen; $R_1$ is hydrogen or alkyl or phenyl; $R_2$ and $R_3$ each is hydrogen or alkyl; and $R_4$ is cyano, carboxyl or thiocarboxyl, or a salt, ester or optionally mono-N-substituted amide thereof. Examples of suitable substituents on the amide group are phenol, carbamoyl or lower carboxyalkyl.

Preferred fungicides of this class are those in which Hal is chlorine or bromine; $R_1$ is hydrogen, alkyl of 1–6 carbon atoms, for example methyl or ethyl, or phenyl; $R_2$ and $R_3$ each is hydrogen or alkyl of 1–6 carbon atoms, for example, methyl or ethyl; and $R_4$ is cyano, carboxyl or one of the following derivatives thereof:

a. an alkali metal salt b. an alkyl ester in which the alkyl group contains from one to 12 carbon atoms, for example methyl, ethyl, isopropyl, butyl, isobutyl, s-butyl, t-butyl, hexyl, octyl or dodecyl, or is an alkyl group of 1–6 carbon atoms substituted by a chlorine atom, by one or two hydroxy groups, or by a mercapto, phenyl, phthalimido, cyclohexene-1,2-dicarboximido, bicycloheptadienyl, pryidyl or trialkyldioxolanyl group, for example chloroethyl, hydroxyethyl, dihydroxy-isobutyl, mercaptoethyl, benzyl, phthalimidomethyl, cyclohexene-1,2-dicarboximidomethyl, bicycloheptadienylmethyl, pyridylmethyl or trimethyl-dioxolanylmethyl; a cycloalkyl, alkenyl or alkynyl ester of up to seven carbon atoms, for example cyclohexyl, propenyl or propynyl; a phenyl ester in which the phenyl group optionally is substituted, for example in the 4-position, by chloro, nitro, methyl or methoxy; a sulpholanyl ester; a dialkylthiazoyl ester, for example an isopropylmethylthiazolyl ester; a pyridyl ester; or an aldohexose ester, for example a glucose ester.

c. an amide optionally mono-N-substituted by phenyl, carbamoyl or carboxymethyl, d. a thiocarboxyl ester in which the ester moiety is an optionally hydroxy-substituted alkyl group, for example methyl or hydroxyethyl, a benzyl or a phenyl-substituted thiazole group.

A particularly preferred subclass of these fungicides consists of those in which Hal is chlorine; $R_1$ and $R_2$ each is methyl or ethyl; $R_3$ is hydrogen; and $R_4$ is carboxyl, the sodium salt thereof, or an alkyl ester thereof in which the alkyl group is an optionally hydroxy-substituted alkyl of 1–6 carbon atoms.

Examples of the particularly preferred subclass are 2,2-dichloro-3,3-dimethylcyclopropane carboxylic acid; the sodium salt thereof and the methyl and hydroxyethyl esters thereof.

The invention includes also, as novel compounds, cyclopropane derivatives of formula I wherein Hal is halogen; $R_1$ and $R_2$ each is alkyl; $R_3$ is hydrogen or alkyl, and $R_4$ is cyano, carboxyl, or a salt, ester or optionally mono-N-substituted amide thereof, or an esterified thiocarboxyl group, with the proviso that when Hal is chlorine, $R_1$ and $R_2$ each is methyl, and $R_3$ is hydrogen, then $R_4$ is other than a carboxyl group or a methyl, ethyl or benzylfurfuryl ester thereof.

Subject to this proviso the preferred novel fungicides are those wherein Hal is chlorine, or bromine; $R_1$ and $R_2$ each is alkyl of 1–6 carbon atoms, for example methyl or ethyl; $R_3$ is hydrogen or alkyl of 1–6 carbon atoms, for example methyl; and $R_4$ is as defined in relation to the preferred fungicides.

Particularly preferred of these fungicides are the sodium salt and hydroxyethyl ester of 2,2-dichloro-3,3-dimethylcyclopropane carboxylic acid.

The cyclopropane derivatives of formula I wherein $R_4$ is an alkyl ester of a carboxyl group may be prepared by a process which comprises reacting an ester of an alpha,beta-unsaturated carboxylic acid of formula:

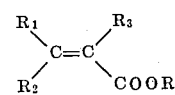

(II)

wherein R is alkyl, with a compound capable of yielding a dihalocarbene, for example, sodium trichloroacetate, phenyl tribromomethylmercury or phenyl trichloromethylmercury.

The compounds wherein $R_4$ is carboxyl are prepared by a process which comprises hydrolyzing the corresponding alkyl ester under aqueous acidic or basic conditions.

The salts of those compounds wherein $R_4$ is carboxyl are obtained by neutralizing the acid with the appropriate base.

Esters of those compounds wherein $R_4$ is carboxyl or thiocarboxyl are obtained by preparing an acid halide of formula:

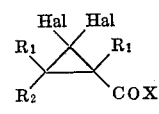

(III)

wherein X is halogen, suitably chlorine, and reacting this halide with the appropriate compound containing a hydroxy or mercapto group, in the presence of a hydrogen halide acceptor, for example a tertiary amine such as a triethylamine or pyridine.

Optionally mono-N-substituted amides of those compounds wherein $R_4$ is carboxyl are obtained by reacting an acid chloride of formula (III) with ammonia or the appropriate compound containing a primary amino group.

The compounds wherein $R_4$ is cyano are obtained by dehydrating the corresponding amide using phosphorus pentoxide.

The fungicidal activity of the compositions and compounds of the invention is especially marked against fungal diseases of rice crops, in particular against rice blast (*Pyricularia oryzae*). The invention includes therefore a method of protecting crops, especially rice crops, against fungal attack, in which the crops, the seeds thereof, or soil or water in which the crops are growing or are to be grown are treated with a fungicidally effective amount of a cyclopropane derivative of formula (I) or a composition according to the invention.

The term "carrier" as used herein means a solid or fluid material, which may be inorganic or organic and of synthetic or natural origin, with which the active compound is mixed or formulated to facilitate its application to the plant, seed, soil or other object to be treated, or its storage, transport or handling.

The surface-active agent may be an emulsifying agent or a dispersing agent or a wetting agent; it may be nonionic or ionic.

Any of the carrier materials or surface-active agents usually applied in formulating pesticides may be used in the compositions of the invention and suitable examples of these are to be found, for example, in British Pat. No. 1,232,930.

The compositions of the invention may be formulated as wettable powders, dusts, granules, solutions, emulsifiable concentrates, emulsions, suspension concentrates or aerosols. Wettable powders are usually compounded to contain 25, 50 or 75%w of toxicant and usually contain, in addition to solid carrier, 3–10%w of a dispersing agent and, where necessary, 0–10%w of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10%w of toxicant. Granules are usually prepared to have a size between 10 and 100 BS mesh (1.676–0.152 mm), and may be manufactured by agglomeration or impregnation techniques. Generally, granules will contain ½–25% toxicant and 0–10%w of additives such as stabilizers, slow release modifiers and binding agents. Emulsifiable concentrates usually contain, in addition to the solvent and, when necessary, co-solvent, 10–50% w/v toxicant, 2–20% w/v emulsifiers and 0–20% w/v of appropriate additives such as stabilizers, penetrants and corrosion inhibitors. Suspension concentrates are compounded so as to obtain a stable, non-sedimenting, flowable product and usually contain 10–75%w toxicant, 0.5–15%w of dispersing agents, 0.1–10%w of suspending agents such as protective colloids and thixotropic agents, 0–10%w of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersions and emulsions, for example, compositions obtained by diluting a wettable powder or a concentrate according to the invention with water, also lie within the scope of the present invention. The said emulsions may be of the water-in-oil or of the oil-in-water type, and may have a thick "mayonnaise"-like consistency.

The compositions of the invention may also contain other ingredients, for example, other compounds possessing pesticidal, especially insecticidal, acaricidal, herbicidal or fungicidal properties.

The invention is further illustrated in the following examples, the identity of the product in each case, having been confirmed by elemental analysis.

EXAMPLE I

Methyl 2,2-dichloro-3,3-dimethylcyclopropanecarboxylate

Dry sodium trichloroacetate (126 grams) was added over a period of 1¾ hours to methyl 3,3-dimethylacrylate (114 grams) at 115° C. The mixture was heated for a further 2 hours at 115° C. The mixture was filtered and the filtered solid was washed with chloroform (50 milliliters). The combined filtrate and washings was fractionally distilled and the desired product was obtained as a colorless liquid, boiling point 86°–87° C at 15 torr.

EXAMPLE II 2,2-Dichloro-3,3-dimethylcyclopropanecarboxylic acid

Methyl 2,2-dichloro-3,3-dimethylcyclopropanecarboxylate (157 grams) prepared as in Example I, formic acid (73.6 grams) and concentrated sulfuric acid (2 milliliters) were heated together at 100°–115° C until conversion to the acid was completed as shown by gas-liquid chromatography. The mixture was cooled and filtered. The solid obtained was washed with a little water and dried to yield the desired product as a solid melting point: 111.5°–112.5° C.

EXAMPLE III

Sodium 2,2-dichloro-3,3-dimethylcyclopropanecarboxylate 2,2-Dichloro-3,3-dimethylcyclopropane carboxylic acid (27.9 grams) was suspended in water (100 milliliters) and the suspension was treated with sodium bicarbonate (13.0 grams). The resulting solution was evaporated to dryness under reduced pressure and the residue was dissolved in ethanol (400 milliliters) and filtered. The required product was obtained by precipitation from the ethanol solution by addition of ether.

EXAMPLE IV 2,2-Dichloro-3,3-dimethylcyclopropanoyl chloride 2,2-Dichloro-3,3-dimethylclopropane carboxylic acid (183 grams) and thionyl chloride (119 grams) were heated together under reflux for 4 hours. The reaction mixture was then fractionally distilled and the required product was obtained as a colorless liquid, boiling point 80° C at 13 torr.

EXAMPLE V

2-Hydroxyethyl 2,2-dichloro-3,3-dimethylcyclopropane-carboxylate 2,2-Dichloro-3,3-dimethylcyclopropanoyl chloride (11.1 grams) was added to a mixture of glycol (31 grams) and pyridine (100 milliliters) cooled to 0° C. The mixture was allowed to stand at 0° for 1 hour and then at room temperature for 1 hour. The mixture was heated to 100° C for a further 1 hour and then poured into an ice/water mixture. The aqueous mixture was extracted with ether (3 × 50 milliliters) and the combined extracts were washed successively with 10% hydrochloric acid, 5% sodium bicarbonate solution and water. The ether was removed under reduced pressure and the residue was fractionally distilled to yield the required product, boiling point, 152°–154° C at 13 torr.

EXAMPLE VI

S-methyl 2,2-dichloro-3,3-dimethylcyclopropane-thiocarboxylate

Triethylamine (22.2 grams) was added to a solution of methyl mercaptan (48 grams) in benzene (100 milliliters) maintained at 5° C. 2,2-Dichloro-3,3-dimethylcyclopropanoyl chloride (40.3 grams) was then added to the stirred mixture at 5° C over a period of 30 minutes. The mixture was stirred for a further 3 hours in an ice bath and then allowed to stand at room temperature for 16 hours. The mixture was then shaken with water, followed by 5% hydrochloric acid. The solvent was removed under reduced pressure and the residue purified by distillation to yield the required product, boiling point 84° C aat 2 torr.

EXAMPLE VII 2,2-Dichloro-3,3-dimethylcyclopropane carboxamide 2,2-Dichloro-3,3-dimethylcyclopropanoyl chloride was reacted with an excess of cold aqueous ammonia solution (~35%) to yield the crude product, which was recrystallized from methanol to give a white solid, melting point 77°–79° C.

EXAMPLE VIII 2,2-Dichloro-3,3-dimethylcyclopropane carbonitrile 2,2-Dichloro-3,3-dimethylcyclopropane carboxamide (5.2 grams, prepared as in the previous Example) and phosphorus pentoxide (7.5 grams) were heated together in a 50 milliliter flask incorporated in a vacuum distillation apparatus. The desired product distilled over on formation as a colorless oil, boiling point, 68° C at 19 torr.

EXAMPLE IX

N-(2,2-dichloro-3,3-dimethylcyclopropanoyl) glycine

Glycine (2.0 grams) and sodium hydroxide (1.0 grams) were dissolved in water (20 milliliters) and the solution cooled in ice. A solution of sodium hydroxide (1.0 gram) in water (10 milliliters) and 2,2-dichloro-3,3-dimethylpropanoyl chloride (4.2 grams) were added simultaneously over a period of 10 minutes to the sodium glycinate solution. The mixture was allowed to stand for 20 minutes and was then treated with concentrated hydrochloric acid to pH 1. The oil which separated was extracted with ether and the extracts were washed with water, dried and evaporated under reduced pressure. The solid obtained was shaken with benzene to remove the last traces of the acid chloride and leave the pure product, melting point, 138°–140° C.

EXAMPLE X

Glucose esters of 2,2-Dichloro-3,3-dimethylcyclopropane-carboxylic acid (a) Dry D(+) glucose (33.75 grams) was dissolved in dry pyridine (250 milliliters) and to this solution at −5° was added 2,2-dichloro-3,3-dimethylcyclopropanoyl chloride (5.0 grams) in dry chloroform (10 milliliters). The mixture was allowed to stand at −5° C for 1 hour then at room temperature. The supernatant liquid was decanted off, mixed with water (300 milliliters) and extracted with ether (2 × 150 milliliter). The extracts were washed with water (4 × 300 milliliters), dried and the solvent removed under reduced pressure. The residue was chromatographed on silica gel using mixtures of chloroform and ethyl acetate as eluant and three components were obtained as oils
1. a glucose monoester
2. a glucose di-ester
3. a glucose tri-ester
b. When the procedure of (a) was repeated using an excess of the acid chloride a glucose penta-ester was obtained, melting point 62°–63° C.

EXAMPLE XI 2,2,4-trimethyl-1,3-dioxolan-4-ylmethyl 2,2-dichloro-3,3-dimethyl-cyclopropane carboxylate 2,2,4-Trimethyl-4-hydroxymethyl-1,3-dioxolane (8.4 grams) was dissolved in pyridine (50 milliliters) and 2,2-dichloro-3,3-dimethylcyclopropanoyl chloride (11.4 grams) was added to the solution which was cooled to 0°–5° C. The solution was then allowed to stand at room temperature for 16 hours. The pyridine was removed under reduced pressure and the residue dissolved in ether. The ether solution was washed with water, dried with sodium sulfate and evaporated. The residue was fractionally distilled to yield the required product as an oil, boiling point, 107°–108° C at 0.4 torr.

EXAMPLE XII 2,3-dihydroxy-2-methylpropyl 2,2-dichloro-3,3-dimethylcyclopropane-carboxylate 2,2,4-Trimethyl-1,3-dioxolan-4-ylmethyl 2,2-dichloro-3,3-dimethylcyclopropane carboxylate (6.0 grams, prepared as in previous example) was dissolved in 50% aqueous ethanol (100 milliliters) containing concentrated hydrochloric acid (3 milliliters) and the solution was allowed to stand for 48 hours at room temperature. The solvent was then removed under reduced pressure and the residue was crystallized from cyclohexane to give the desired product, melting point, 54.5°–55° C.

EXAMPLE XIII 2,2-Dichloro-1,3,3-trimethylcyclopropanecarboxylic acid

Ethyl 2,2-dichloro-1,3,3-trimethylcyclopropanecarboxylate (7.3 grams) was heated under reflux for 1 hour with a 5% solution of sodium hydroxide in aqueous ethanol (40 milliliters). About 15 milliliters of ethanol was then removed by distillation and the remaining solution was shaken with ether. The aqueous layer was separated and acidified to give the free acid. The ether layer was shaken with aqueous sodium bicarbonate solution and the aqueous layer was separated and acidified to give a further quantity of the free acid. The crude material was recrystallized from hot water to give the desired product, melting point, 144° C.

EXAMPLE XIV

Ethyl 2,2-dichloro-3,3-diethylcyclopropane-carboxylate

Ethyl 3,3-diethylacrylate (23.0 grams) and phenyl trichloromethylmercury (19.3 grams) in dry benzene were heated together under reflux for 27 hours under an atmosphere of nitrogen. The mixture was cooled, filtered and the filtrate distilled to yield the required product, boiling point, 120°–122° C at 12 torr.

EXAMPLE XV

Methyl 2,2-dibromo-3,3-dimethylcyclopropane-carboxylate

Methyl 3,3-dimethylacrylate (12.8 grams) and phenyl tribromomethylmercury were reacted together in similar manner to that of the previous example to yield the required product, boiling point 110°–112° C at 13 torr.

EXAMPLE XVI

Following procedures similar to those given in the previous examples, further cyclopropane derivatives were prepared, whose physical characteristics are set out in Table I.

TABLE I

| Compound | °C, Melting Point | °C, Boiling Point (torr) |
|---|---|---|
| 2,2-dichloro-3,3-dimethylcyclopropane-N-phenylcarboxamide | 100 | |
| phenyl 2,2-dichloro-3,3-dimethyl-cyclopropane-carboxylate | 64–68 | |
| ethyl 2,2-dichloro-3,3-dimethyl-cyclopropane-carboxylate | | 94–96 (10) |
| ethyl 2,2-dichloro-1,3,3-trimethyl-cyclopropane carboxylate | | 98–99.5 (10) |
| butyl 2,2-dichloro-3,3-dimethylcyclopropane carboxylate | | 100 (10) |
| hexyl 2,2-dichloro-3,3-dimethylcyclopropane carboxylate | | oil |
| benzyl 2,2-dichloro-3,3-dimethyl-cyclopropane carboxylate | | oil |
| t-butyl 2,2-dichloro-3,3-dimethyl-cyclopropane carboxylate | | oil |
| ethyl 2,2-dichloro-3-methylcyclopropane-1-carboxylate | | 85–90 (4.5 |
| methyl 2,2-dichloro-3-phenylcyclopropane-1-carboxylate | 63.5–65.5 | |
| 2,2-dichloro-3-phenylcyclopropane-1-carboxylic acid | 109.5–111 | |
| octyl 2,2-dichloro-3,3-dimethyl-cyclopropane-carboxylate | | oil |
| dodecyl 2,2-dichloro-3,3-dimethyl-cyclopropane carboxylate | | oil |
| methyl 2,2-dichloro-1-methylcyclopropane-carboxylate | | 72–72.5 (13) |
| phthalimidomethyl 2,2-dichloro-3,3-dimethylcyclopropane carboxylate | 102–104 | |
| cyclohex-1-en-1,2-carboximidomethyl 2,2-dichloro-3,3-dimethylcyclopropane-carboxylate | 90–92 | |
| cyclohex-3-en-1,2-carboximidomethyl 2,2-dichloro-3,3-dimethylcyclopropane-carboxylate | 150–151 | |
| N-2,2-dichloro-3,3-dimethylcyclopropanoyl) urea | 190.5–192.5 | |
| S-(4-phenylthiazol-2-yl) 2,2-dichloro-3,3-dimethylcyclopropane-thiocarboxylate | | 99–100 |
| bicyclo (2,2,1) hepta-2,5-dien-2-2-ylmethyl 2,2-dichloro-3,3-dimethylcyclopropane-carboxylate | | oil |
| sulpholan-3-yl 2,2-dichloro-3,3-dimethylcyclopropane-carboxylate | 101.5–102.5 | |
| 2,2-dichloro-3-methylcyclopropane-1-carboxylic acid | 63.5–65.5 | |

TABLE I – Continued

| Compound | °C, Melting Point | °C, Boiling Point (torr) |
|---|---|---|
| S-benzyl 2,2-dichloro-3,3-dimethyl-cyclopropane-thiocarboxylate | | oil |
| 2-chloroethyl 2,2-dichloro-3,3-dimethylcyclopropane-carboxylate | | 72–76 (0.1–0.2) |
| isopropyl 2,2-dichloro-3,3-dimethyl-cyclopropane-carboxylate | | 62 (1.1) |
| allyl 2,2-dichloro-3,3-dimethylcyclopropane carboxylate | | 58–60 (0.5) |
| propargyl 2,2-dichloro-3,3-dimethyl-cyclopropane-carboxylate | | 62–70 (0.1–0.15) |
| cyclohexyl 2,2-dichloro-3,3-dimethyl-cyclopropane-carboxylate | | 84–88 (0.1–0.2) |
| s-butyl 2,2-dichloro-3,3-dimethyl-cyclopropane-carboxylate | | 66–69 |
| isobutyl 2,2-dichloro-3,3-dimethyl-cyclopropane-carboxylate | | 121–122 (14) |
| 2-mercaptoethyl 2,2-dichloro-3,3-dimethylcyclopropane-carboxylate | | oil |
| S-(2-hydroxyethyl) 2,2-dichloro-3,3-dimethylcyclopropane-thiocarboxylate | | oil |
| 4-nitrophenyl 2,2-dichloro-3,3-dimethyl-cyclopropane-carboxylate | 72–74 | |
| 4-chlorophenyl 2,2-dichloro-3,3-dimethyl-cyclopropane-carboxylate | 56.5–58 | |
| 4-methoxyphenyl 2,2-dichloro-3,3-dimethyl-cyclopropane-carboxylate | | oil |
| p-tolyl 2,2-dichloro-3,3-dimethyl-cyclopropane-carboxylate | | oil |
| 2-methyl-4-isopropylthiazol-5-yl 2,2-dichloro-3,3-dimethyl-cyclopropane-carboxylate | | oil |
| methyl 2,2-dichloro-1,3-dimethyl-cyclopropane-1-carboxylate | | 87–90 (15) |
| 2,2-dichloro-1,3-dimethylcyclopropane-1-carboxylic acid | 80–81 | |
| pyrid-3-ylmethyl 2,2-dichloro-3,3-dimethylcyclopropane carboxylate | | oil |
| pyrid-3-yl 2,2-dichloro-3,3-dimethyl-cyclopropane carboxylate | 61–63 | |
| 2,2-dichloro-3,3-diethylcyclopropane-(N-phenyl)carboxamide | 98–99 | |
| 2,2-dichloro-3,3-diethylcyclopropane carboxylic acid | 77–78 | |
| 2,2-dibromo-3,3-dimethylcyclopropane carboxylic acid | 145–146 | |

EXAMPLE XVII

Fungicidal Activity against *Pyricularia oryzae* (rice blast)

The cyclopropane derivatives of the invention were tested for activity against rice blast in the following manner:

Rice plants were grown from seed in soil contained in seven 5 centimeter diameter pots. After 8 days the soil was drenched with 50 millimeters of an aqueous solution of suspension containing 250 parts per million of the test compound. Two days after drenching the plants were inoculated with spores of *Pyricularia oryzae* (rice blast). Observations on the development of the disease were made after a further 6 days.

The results of the tests are set out in Table 2, in which a result 2 indicates more than 80% control of the fungus, a result 1 indicates 50–80% control and a result 0 indicates less than 50% control.

EXAMPLE XVIII

Fungicidal Activity against other Fungal Diseases

*a.* Foliar spray tests

Solutions or suspensions containing 0.25% of the test chemical. 5% acetone, 1% glycerol and 0.005% Triton X-100 were sprayed onto selected leaf surfaces of two plant species. Each treatment was triplicated.

i. Broad bean plants were sprayed on the upper and lower surfaces of their first and second difoliate leaves, leaving the third expanded leaf unsprayed. Two days after treatment the plants were inoculated with spores of Uromyces fabae and observations on the development of the rust-symptoms were made after a further 8 days.

ii. Cucumber plants were sprayed on the upper surfaces of the first leaf and the lower surface of the second leaf leaving the third and fourth leaves unsprayed. The upper surfaces of all leaves were inoculated with spores of Erysiphe cichoracearum 2 days after treatment. Assessments of the fungal infection were made 10 days after inoculation.

b. Root treatment test

A quantity of 12 milligrams of the finely ground test compound was applied to the surface of each of three soil samples, which were then sown each with 12 wheat seeds which were covered with soil and allowed to grow for 10 days. The resulting plants were then inoculated with spores of Puccine recondita (brown rust) and observations on the development of the fungus were made after 7 days.

The results of these tests are set out in Table 3 in which a result 2 indicates more than 80% control of the fungus, 1 indicates 50–80% control and 0 indicates less than 50% control.

TABLE 2

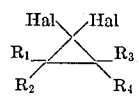

| Compound | | | | | Activity against P. oryzae |
|---|---|---|---|---|---|
| Hal | $R_1$ | $R_2$ | $R_3$ | $R_4$ | |
| Cl | H | H | $CH_3$ | $COOCH_3$ | 2 |
| Cl | $CH_3$ | $CH_3$ | H | $COOCH_3$ | 2 |
| Cl | $CH_3$ | $CH_3$ | H | $CONHC_6H_5$ | 0 |
| Cl | $CH_3$ | $CH_3$ | H | $COOH$ | 2 |
| Cl | $CH_3$ | $CH_3$ | H | $COOC_6H_5$ | 2 |
| Cl | $CH_3$ | $CH_3$ | H | $CONH_2$ | 2 |
| Cl | $CH_3$ | $CH_3$ | H | $COOC_2H_5$ | 2 |
| Cl | $CH_3$ | $CH_3$ | $CH_3$ | $COOC_2H_5$ | 0–1 |
| Cl | $CH_3$ | $CH_3$ | H | $CONHCONH_2$ | 1 |
| Cl | $CH_3$ | $CH_3$ | H | $COOCH_2$–N(phthalimide-type) | 2 |
| Cl | $CH_3$ | $CH_3$ | H | $CONHCH_2COOH$ | 1 |
| Cl | $CH_3$ | $CH_3$ | H | $COONa$ | 2 |
| Cl | $CH_3$ | $CH_3$ | H | $COO(CH_2)_3CH_3$ | 2 |

TABLE 2—Continued

| Compound | | | | | Activity against P. oryzae |
|---|---|---|---|---|---|
| Hal | $R_1$ | $R_2$ | $R_3$ | $R_4$ | |
| Cl | $CH_3$ | $CH_3$ | H | $COO(CH_2)_5CH_3$ | 2 |
| Cl | $CH_3$ | $CH_3$ | H | $COOCH_2C_6H_5$ | 2 |
| Cl | $CH_3$ | $CH_3$ | $CH_3$ | $COOH$ | 2 |
| Cl | $CH_3$ | $CH_3$ | H | $COOC(CH_3)_3$ | 2 |
| Cl | $CH_3$ | H | H | $COOC_2H_5$ | 2 |
| Cl | $CH_3$ | $CH_3$ | H | $COOCH_2CH_2OH$ | 2 |
| Cl | $C_6H_5$ | H | H | $COOH$ | 1 |
| Cl | $CH_3$ | $CH_3$ | H | $COO(CH_2)_7CH_3$ | 2 |
| Cl | $CH_3$ | $CH_3$ | H | $COOCH_2$–(cyclohexenyl) | 2 |
| Cl | $CH_3$ | $CH_3$ | H | (sulfonyl cyclic with COO) | 2 |
| Cl | $CH_3$ | $CH_3$ | H | $CN$ | 1 |
| Cl | $CH_3$ | H | H | $COOH$ | 1 |
| Cl | $CH_3$ | $CH_3$ | H | $COSCH_2C_6H_5$ | 1 |
| Cl | $CH_3$ | $CH_3$ | H | $COOCH_2CH=CH_2$ | 1 |
| Cl | $CH_3$ | $CH_3$ | H | $COSCH_3$ | 1 |
| Cl | $CH_3$ | $CH_3$ | H | $COOCH_2CH_2SH$ | 1 |
| Cl | $CH_3$ | $CH_3$ | H | $COSCH_2CH_2OH$ | 1 |
| Cl | $CH_3$ | $CH_3$ | H | $COO$–C$_6$H$_4$–$NO_2$ | 1 |
| Cl | $CH_3$ | $CH_3$ | H | $COO$–C$_6$H$_4$–$Cl$ | 1 |
| Cl | $CH_3$ | $CH_3$ | H | $COO$–C$_6$H$_4$–$CH_3$ | 1 |
| Cl | $CH_3$ | $CH_3$ | H | $(CH_3)$–CH (thiazole-CH$_3$) COO | 1–2 |
| Cl | $CH_3$ | $CH_3$ | H | $COO$–pyridyl | 1–2 |
| Cl | $CH_3$ | $CH_3$ | H | $COOCH_2$–pyridyl | 2 |
| (Cl | $CH_3$ | $CH_3$ | H | $COO)_1$ Glucose | 2 |
| (Cl | $CH_3$ | $CH_3$ | H | $COO)_2$ Glucose | 1 |

TABLE 3

| Compound | | | | | Fungicidal activity | | | | |
|---|---|---|---|---|---|---|---|---|---|
| | | | | | U. Fabae | | E. cichoracearum | | |
| Hal | $R_1$ | $R_2$ | $R_3$ | $R_4$ | Direct | Systemic* | Direct | Systemic* | P. recondita |
| Cl | $CH_3$ | $CH_3$ | H | $CONHC_6H_5$ | 1 | 0 | 0 | 0 | 1 |
| Cl | $CH_3$ | $CH_3$ | H | $CONH_2$ | 0 | 0 | 0 | 0 | 1 |
| Cl | $CH_3$ | $CH_3$ | H | 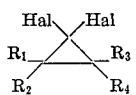 $COOCH_2$–(cyclohexenyl) | 1 | 0 | | | 0 |
| Cl | $CH_3$ | H | H | $COOH$ | 1 | 0 | 0 | 0 | 0 |
| Cl | $CH_3$ | $CH_3$ | H | $COSC_6H_5$ | 1 | 0 | | | |
| Cl | $CH_3$ | $CH_3$ | H | $(CH_3)_2CH$–(thiazole-CH$_3$) COO | 0 | 0 | 2 | 2 | 0 |
| Cl | $CH_3$ | $CH_3$ | H | $COO$–pyridyl | 0 | 0 | 2 | 0 | 0 |
| (Cl | $CH_3$ | $CH_3$ | H | $COO)_2$ Glucose | 2 | 0 | 0 | 0 | 0 |

*Including translaminar effect.

We claim as our invention:

1. A method of combatting the fungus *P. oryzae* which comprises contacting said fungus with a fungus inhibiting amount of at least one compound of the formula

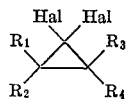

wherein each Hal is chlorine or bromine; $R_1$ is a hydrogen, alkyl of 1–6 carbon atoms or phenyl; $R_2$ and $R_3$ each is hydrogen or alkyl of 1–6 carbon atoms; and $R_4$ is carboxyl; or an alkali metal salt thereof.

2. The method of claim 1 in which each Hal is chlorine; $R_1$ and $R_2$ each is methyl or ethyl; $R_3$ is hydrogen; and $R_4$ is carboxyl; or the sodium salt thereof.

3. The method of claim 1 wherein the compound is 2,2-dichloro-3,3-dimethylcyclopropane carboxylic acid.

* * * * *